(12) United States Patent
Jackson et al.

(10) Patent No.: US 10,648,736 B2
(45) Date of Patent: May 12, 2020

(54) REVERSE CATENARY MUFFLE

(71) Applicant: THE ALLOY ENGINEERING COMPANY, Berea, OH (US)

(72) Inventors: Glenn Jackson, North Royalton, OH (US); Bradley Lyle, Medina, OH (US)

(73) Assignee: THE ALLOY ENGINEERING COMPANY, Berea, OH (US)

( * ) Notice: Subject to any disclaimer, the term of this patent is extended or adjusted under 35 U.S.C. 154(b) by 0 days.

(21) Appl. No.: 15/817,775

(22) Filed: Nov. 20, 2017

(65) Prior Publication Data

US 2018/0202716 A1     Jul. 19, 2018

Related U.S. Application Data

(60) Provisional application No. 62/424,037, filed on Nov. 18, 2016.

(51) Int. Cl.
| | |
|---|---|
| *F27D 1/02* | (2006.01) |
| *B23P 15/26* | (2006.01) |
| *F27B 9/30* | (2006.01) |
| *F27B 9/20* | (2006.01) |

(52) U.S. Cl.
CPC .............. *F27D 1/028* (2013.01); *B23P 15/26* (2013.01); *F27B 9/20* (2013.01); *F27B 9/30* (2013.01); *F27B 2009/305* (2013.01)

(58) Field of Classification Search
USPC ......................................................... 432/247
See application file for complete search history.

(56) References Cited

U.S. PATENT DOCUMENTS

| | | | | |
|---|---|---|---|---|
| 2,028,106 | A * | 1/1936 | Otis ........................ | C21D 9/663 266/256 |
| RE20,028 | E * | 7/1936 | Cochran ................. | F27B 9/205 198/775 |
| 4,481,024 | A * | 11/1984 | Bly ......................... | C03B 5/237 65/134.2 |

* cited by examiner

*Primary Examiner* — Steven B McAllister
*Assistant Examiner* — John E Bargero
(74) *Attorney, Agent, or Firm* — Fay Sharpe LLP

(57) ABSTRACT

A reverse catenary muffle, and method of forming same, includes a planar lower surface, and first and second sidewalls extending upwardly in parallel relation from opposite, first and second edges, respectively, of the lower surface. A concave arch-shaped upper surface extending from upper ends of the first and second sidewalls wherein upper portions of the arch-shaped upper surface are defined at an interconnection of the upper surface with the sidewalls, and a central portion of the upper surface spaced from the lower surface.

17 Claims, 4 Drawing Sheets

REVERSE CATENARY MUFFLE

This application claims the priority benefit of U.S. provisional application Ser. No. 62/424,037, filed Nov. 18, 2016, the disclosure of which is hereby incorporated by reference.

BACKGROUND

This invention relates to high temperature furnace muffles and more particularly to a new high temperature muffle that addresses problems with prior art designs and extends the useful life of the muffle.

It is well known to manufacture a wide variety of products and materials in furnaces, and the product or material proceeds through an elongated, hollow, controlled atmosphere furnace muffle. The muffle is required to operate in a hostile temperature environment and must cooperate with the furnace chamber, product work package (product or material), an existing furnace support structure, be adaptable to different process temperatures and atmospheres, and must accommodate different material and ingredient temperature-dependent characteristics. Some muffle design considerations include the cross-sectional shape, corrugated design for rigidity and strength, wall thickness, joint assembly, weld joint design, and forming method, although this list should not be deemed exhaustive of all design considerations. In these various application-specific environments, different configurations of the muffle are designed to meet or exceed desired performance requirements, extend component life, and likewise minimize operating and maintenance costs.

A common muffle design includes a convex, catenary arch along an upper surface of the muffle. The catenary arch cross-sectional shape is desirable because the arch equalizes stress throughout the section and thus provides improved strength and component life. The muffle includes a generally planar, horizontal surface that typically forms a first, lower surface of the muffle. Material or product enters into an inlet at a proximal or first end of the muffle and is advanced along the lower surface typically in a longitudinal direction toward an outlet located at a distal or second end of the muffle. Extending upwardly in substantially parallel relation from opposite edges of the lower surface are support surfaces, sidewalls, or reinforcing piers. Upper ends of the sidewalls receive terminal edges of the convex, catenary arch so that the lower surface, sidewalls, and the upper catenary arch form and enclose a muffle cavity that extends longitudinally from the inlet to the outlet. Belts, conveyors, pushing mechanisms, etc., advance the material or parts that enter the inlet at the first end of the muffle toward the outlet located at the second end of the muffle.

It is known to form the muffle of a durable material such as stainless steel and particularly a commonly used material is stainless steel nickel alloy, although other materials may be incorporated to address the need, for example, of different characteristics such as high temperature strength, carburization resistance, oxidation resistance, resistance to pitting, improved ductility, enhanced weldability, flaking prevention of an oxide surface, etc.

One failure mode of the muffle is buckling or collapse of the convex, catenary arch. Such a failure alters the cross-sectional profile of the material/product and gas flow through the muffle cavity. It may also result in a tear or a leak path resulting in a leak to atmosphere. Failure typically requires repair or replacement. It is believed that, although the configuration of the catenary arch design equalizes stress throughout the section which improves strength and component life, the convex arch (like the remainder of the muffle) is subject to thermal stresses from heating and cooling, as well as the harsh environment of the atmosphere within the muffle as it interacts with the materials and products transferred therethrough. A need exists to explore alternative configurations that may improve useful life and further delay potential failure associated with buckling or collapse of the convex catenary arch.

A need exists for an improved arrangement that enhances useful life, reduces use of atmosphere in the muffle, provides at least one or more of the above-described features and advantages, as well as still other features and benefits.

SUMMARY

A reverse catenary muffle is provided.

The muffle is adapted to receive associated material/parts. The muffle of the present disclosure includes a planar lower surface, first and second sidewalls extending upwardly in parallel relation from opposite, first and second edges, respectively, of the lower surface, and a concave, arch-shaped upper surface extending from upper ends, of the first and second sidewalls. Upper portions of the arch-shaped upper surface are defined at an interconnection of the upper surface with the sidewalls, and a central portion of the upper surface is in spaced relation with the lower surface.

A method of forming a muffle includes providing a lower surface, and positioning sidewalls along opposite edges of the lower surface that extend upwardly therefrom. The method further includes securing a concave arch-shaped upper surface to upper ends of the first and second sidewalls wherein upper portions of the arch-shaped upper surface are defined at an interconnection of the upper surface with the sidewalls, and a central portion of the upper surface is spaced from the lower surface.

One advantage is the anticipated extended useful life associated with the new muffle.

Another benefit relates to the decreased cross-section of the muffle cavity and cavity volume that would likely result in reduced fuel costs.

Yet another desired result is that the overall footprint of the new muffle is similar to existing muffles so that the new muffle that would be conducive to retrofit and replacement of existing equipment.

Still other benefits and advantages of the present disclosure will become more apparent from reading and understanding the following detailed description.

DETAILED DESCRIPTION

Figure 1:
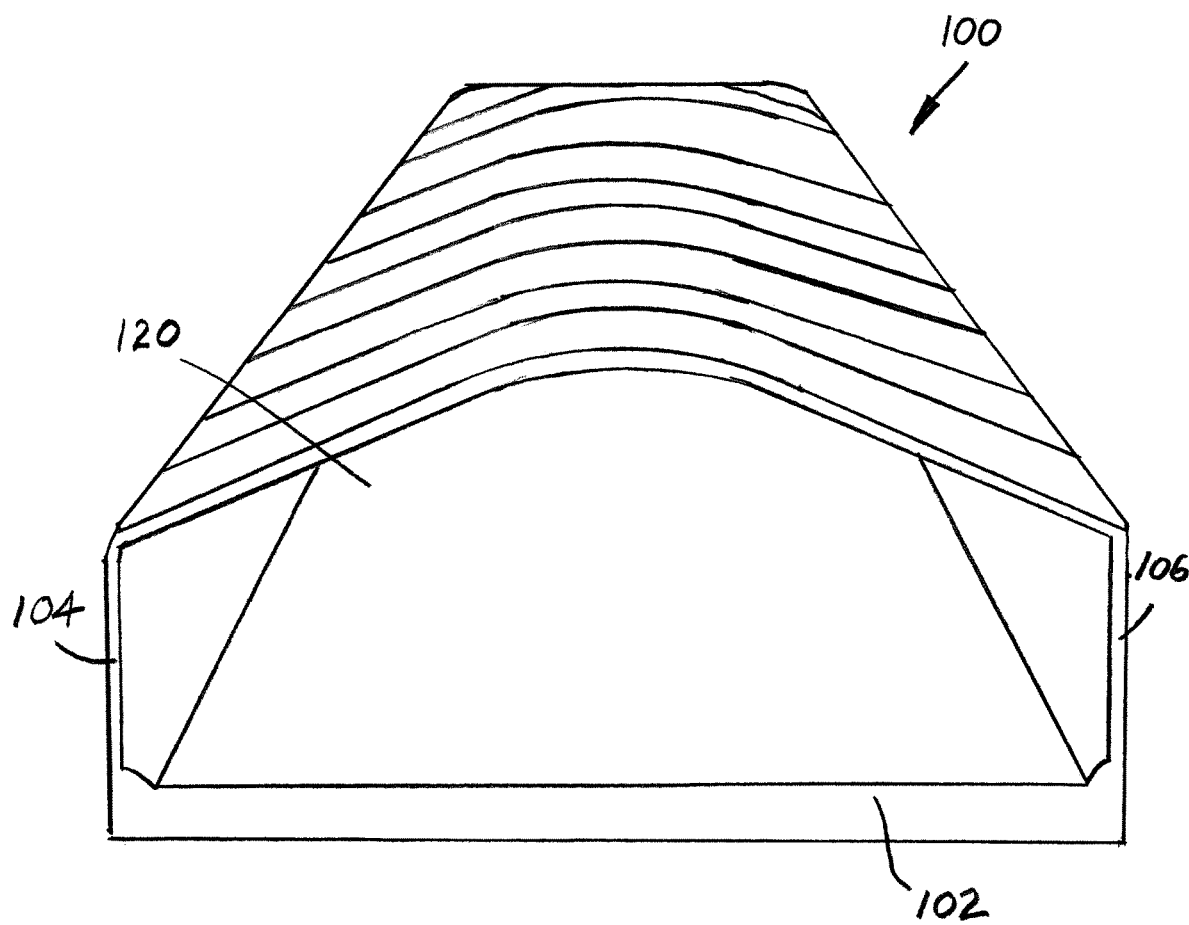
FIG. 1 is a perspective view of a prior art muffle that includes a convex catenary arch forming an upper surface of the muffle.
Figure 2:
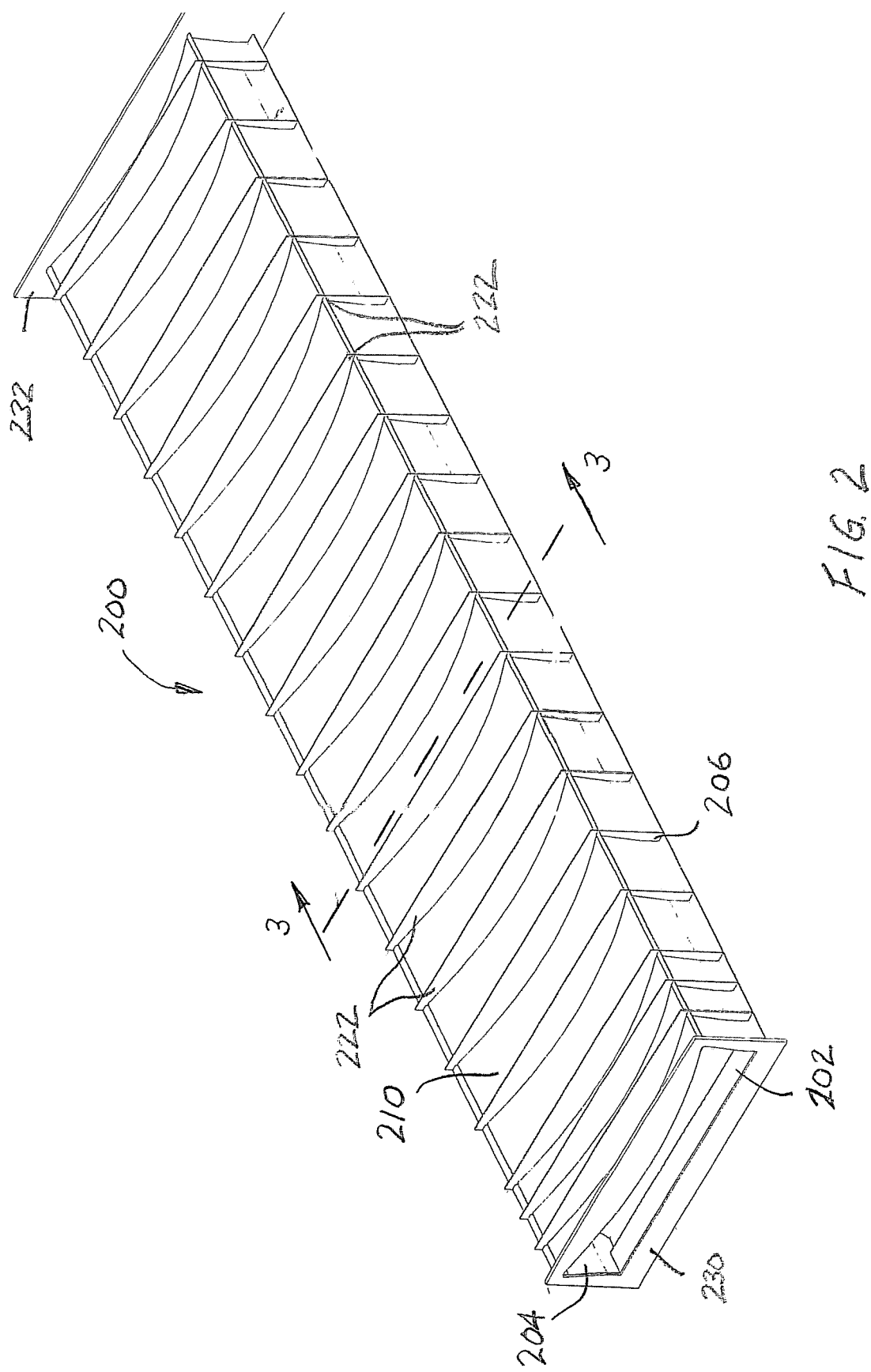
FIG. 2 is a perspective view of a muffle formed in accordance with the teachings of the present disclosure.
Figure 3:
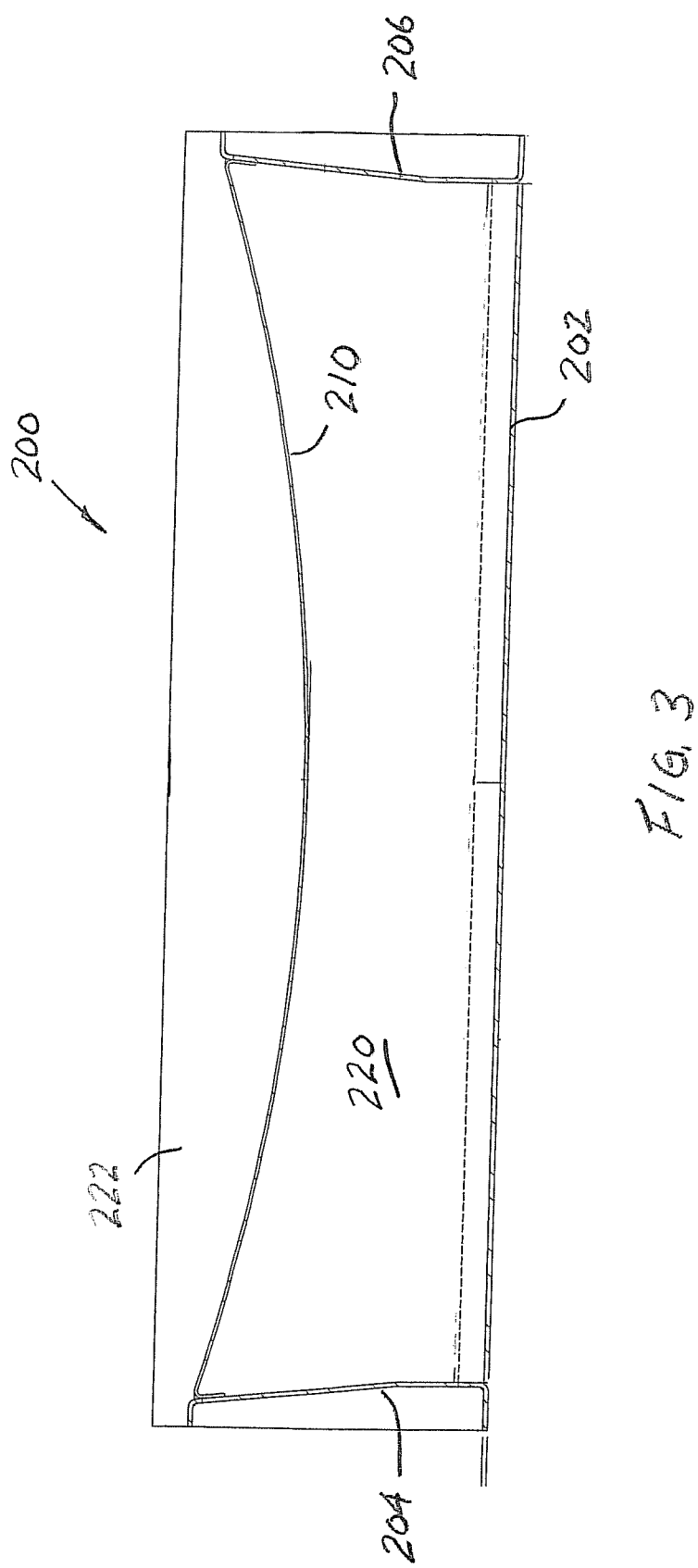
FIG. 3 is a cross-sectional view taken generally along the lines 3-3 of FIG. 2.
Figure 4:
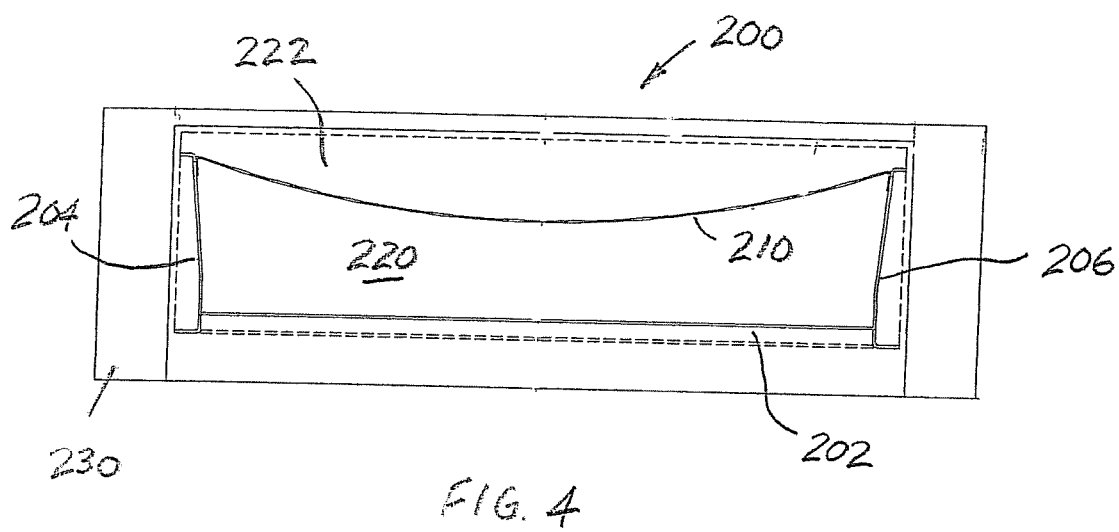
FIG. 4 is an elevational view of the entrance end of the muffle.
Figure 5:
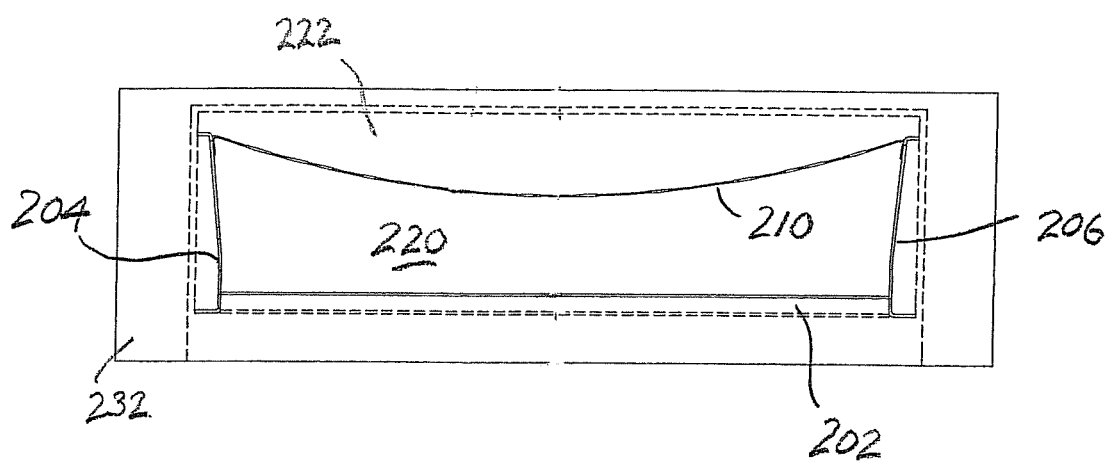
FIG. 5 is an elevational view of the exit end of the muffle.

FIG. 1 shows a prior art arrangement of a muffle 100 that includes a first or generally planar lower surface 102, and first and second sidewalls or piers 104, 106 extending upwardly in substantially perpendicular relation from opposite edges of the lower surface. Interconnecting the sidewalls 104, 106 is a convex-shaped upper surface or catenary arch 110. Together, the lower surface 102, sidewalls 104, 106, and arch 110 enclose a cavity 120 that is sealed from the ambient environment. That is, the portions defining the muffle 100 are sealed together, typically welded together, so that the cavity 120 defines an atmosphere that is an integral part of high temperature processes such as sintering, brazing, annealing, hardening, and carburizing required in connection with the manufacture of material or components/products/parts. The material and products may be associated with a wide variety of industries such as transportation, pulp and paper, petrochemical, primary metals, rod, wire, nonferrous metals, heat treating, powdered metals, general manufacturing, plant engineering, etc., although the list is intended to be exemplary and not limiting.

The convex arch 110 is commonly used as at least a portion or the arch forms the entire upper surface of the muffle. The shape of the catenary arch 110 is well known to evenly distribute forces over the arch and generally limits stress points that would potentially lead to a premature failure or abbreviated useful life. It is not uncommon that if a failure were to occur, at least a portion of the arch 110 buckles or collapses downwardly toward the lower surface, impinging into the cavity 120.

FIGS. 2-5 illustrate a new muffle 200. The muffle 200 includes a generally planar first or lower surface 202, and first and second sidewalls or piers 204, 206 that extend upwardly in substantially perpendicular relation from opposite edges of the lower surface. An upper surface 210 preferably also includes a catenary arch over a portion or an entirety of the upper surface. The lower surface 202, piers 204, 206, and upper surface 210 enclose a cavity 220 of the muffle 200.

In contrast to the design of FIG. 1, the arch 210 of FIGS. 2-5 has a concave shape rather than a convex shape. The upper surface may be strengthened by longitudinally spaced supports 222 that act as rafters or beams to provide strength to the upper surface. This concave shape of the upper surface 210 is advantageous for a number of reasons. First, the same benefits of evenly distributing forces over the arch 210 and generally limiting stress points that might lead to a premature failure or abbreviated useful life are retained with the concave shape. In addition, thermal cycling associated with the muffle 200 would not likely cause collapse, buckling, or a similar failure in a downward direction as potentially experienced with the prior art muffle 100 of FIG. 1. Rather, the concave shape of the arch 210 already adopts a lower potential energy conformation when compared to the convex shape of the arch 110 of the prior art. Gravity acts downwardly on the upper surfaces of the muffles 100, 200—whether the force of gravity places the upper wall under compressive forces (in compression) with the convex shape of the arch 110 of the prior art, or whether gravity places the upper wall under tensile forces (in tension) due to the concave shape of the arch 210 of FIGS. 2-5.

Slight modifications to the design of a typical muffle 100 may be required to accommodate the concave arch 210 in the muffle 200 of FIGS. 2-5. Specifically, in order to accommodate the same type of material or product (not shown) that is advanced along the lower surface 202 through the muffle 200 by a conventional belt, conveyor, pusher element, etc. (not shown) as would be received in the muffle 100 of the prior art arrangement, it may be necessary to increase the height of the sidewalls 204, 206 so that a lowermost point of the concave arch 210 would clear the material/product advancing through the muffle 200. Thus the arch 210 has a minimum spacing relative to the lower surface 202 at a location between the sidewalls 204, 206, and the minimum spacing is preferably at a mid-span location of the upper wall. On the other hand, it is believed that the volume of cavity 220 and cross-sectional area defined between the lower surface 202, concave arch 210, and sidewalls 204, 206 of muffle 200 shown in FIGS. 2-5 would be decreased in comparison to the volume of cavity 120 and the corresponding cross-sectional area defined between the lower surface 102, convex arch 110, and sidewalls 104, 106 of the muffle 100 illustrated in FIG. 1. It is also evident in FIGS. 3, 4, and 5, that the substantially parallel sidewalls 204, 206 include a first, lower portion that extend in parallel relation to one another. The lower portions of the sidewalls 204, 206 are spaced apart by a first dimension measured in the width dimension of the lower surface. The sidewalls also include second or upper, angled portions that angle or diverge outwardly relative to one another to a second dimension greater than the first dimension. That is, the lower portions from the lower surface extend over less than one-half of the total height of the respective sidewall and terminate/merge into the upper, angled portions that proceed over the remainder of the sidewall height. Terminal, outer ends of the angle portion support the outer, opposite edges of the concave upper surface 210.

It is estimated that life of the muffle may increase at least two-fold without any decrease in performance. The cavity 220 of the muffle 200 would still provide a controlled atmosphere for thermally processing the material or parts passing therethrough, the materials of construction (for example stainless steel which is commonly used—again this identification of a preferred material of construction should not limit the present disclosure) would not be different than the construction materials used for the prior art muffle 100. Likewise, interconnection of the muffle 200 with the furnace (not shown) or downstream components (not shown) at the entrance and exit of the muffle, respectively, would essentially remain unchanged. For example, flanges 230, 232 provided at the respective entrance and exit of the muffle 200 would be similar to connecting flanges or other conventional structures used in the prior art muffle 100. This, of course, would also be useful in retrofitting or replacing existing muffles 100 with the new muffle 200 since the dimensional footprint would be similar. Although design parameters may vary due to the new cross-sectional shape and reduced volume associated with the muffle 200, it is also anticipated that there may be an overall energy savings since a lower volume of atmosphere passes through the muffle cavity 222 that has a reduced cross-section and reduced overall volume as a result of incorporating the reverse, concave arch 210 when compared with prior art arrangements.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept, or if they include equivalent structural elements with insubstantial differences.

What is claimed is:

1. An elongated muffle adapted to receive associated material/parts from an associated furnace, the muffle comprising:
   an elongated planar lower surface having a length dimension extending from a first end that communicates with the associated furnace and receives the associated material/parts from the associated furnace, and spaced from a second end along a first axis and having a width dimension less than the length dimension;

an advancing mechanism operatively associated with the elongated, planar lower surface of the muffle, the advancing mechanism configured to receive associated material/parts from the associated furnace and advance the associated material/parts along the lower surface from the first end adjacent the associated furnace to the second end thereof further longitudinally spaced from the associated furnace than the first end;

first and second sidewalls extending upwardly in parallel relation from opposite, first and second edges, respectively, spaced apart in the width dimension of the lower surface; and a metal upper surface extending from upper ends of the first and second sidewalls, wherein the upper surface has at least a portion thereof that is a concave arch-shape in the width dimension having a central portion interposed between first and second outer lateral portions, the central portion of the upper surface located closer to the planar lower surface than the outer lateral portions.

2. The muffle of claim 1 wherein the concave arch-shape extends from the first sidewall to the second sidewall.

3. The muffle of claim 2 wherein upper portions of the arch-shaped upper surface are defined at an interconnection of the upper surface with the sidewalls.

4. The muffle of claim 3 wherein a central portion of the upper surface is spaced from the lower surface.

5. The muffle of claim 4 further including longitudinally spaced supports that provide strength to the upper surface.

6. The muffle of claim 1 wherein upper portions of the arch-shaped upper surface are defined at an interconnection of the upper surface with the sidewalls.

7. The muffle of claim 6 wherein a central portion of the upper surface is spaced from the lower surface.

8. The muffle of claim 1 including longitudinally spaced supports that provide strength to the upper surface.

9. The muffle of claim 1 wherein the elongated planar surface is located closer to an associated ground surface than the concave arch-shape portion of the upper surface.

10. An elongated muffle adapted to receive associated material/parts from an associated furnace, the muffle comprising:

an elongated planar lower surface having a length dimension extending from a first end that communicates with the associated furnace and receives the associated material/parts from the associated furnace, and spaced from a second end along a first axis and having a width dimension less than the length dimension;

first and second sidewalls extending upwardly in parallel relation from opposite, first and second edges, respectively, and each sidewall including a lower portion and an upper, angled portion, the lower portions spaced apart by a first dimension measured in the width dimension of the lower surface, and the angled portions diverging outwardly to a second dimension greater than the first dimension; and an upper surface extending from upper terminal ends of the first and second sidewalls, wherein the upper surface has a concave arch-shape in the width dimension wherein a central portion of the arch-shape is interposed between first and second outer lateral portions, and the central portion of the upper surface is located closer to the planar lower surface than the outer lateral portions.

11. The muffle of claim 10 wherein the concave arch-shape extends from the first sidewall to the second sidewall.

12. The muffle of claim 11 wherein upper portions of the arch-shaped upper surface are defined at an interconnection of the upper surface with the sidewalls.

13. The muffle of claim 12 wherein a central portion of the upper surface is spaced from the lower surface.

14. The muffle of claim 13 further including longitudinally spaced supports that provide strength to the upper surface.

15. The muffle of claim 10 wherein upper portions of the arch-shaped upper surface are defined at an interconnection of the upper surface with the sidewalls.

16. The muffle of claim 15 wherein a central portion of the upper surface is spaced from the lower surface.

17. The muffle of claim 10 including longitudinally spaced supports that provide strength to the upper surface.

* * * * *